(12) United States Patent
Rusch et al.

(10) Patent No.: US 8,833,836 B2
(45) Date of Patent: Sep. 16, 2014

(54) TUNABLE WATER DEFLECTOR

(75) Inventors: Brian R. Rusch, Sterling Heights, MI (US); James K. Platt, Flushing, MI (US); Barbara A. Zuke, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 30 days.

(21) Appl. No.: 13/352,709

(22) Filed: Jan. 18, 2012

(65) Prior Publication Data
US 2013/0180178 A1     Jul. 18, 2013

(51) Int. Cl.
*B60J 5/04* (2006.01)

(52) U.S. Cl.
USPC ............... 296/152; 49/465; 296/154

(58) Field of Classification Search
USPC .......... 296/149.5, 38, 37.1, 39.1, 107.8, 37.6, 296/146.7, 154, 152, 191, 146.5, 218; 49/465
See application file for complete search history.

(56) References Cited

U.S. PATENT DOCUMENTS

| | | | |
|---|---|---|---|
| D248,845 S * | 8/1978 | White et al. | D34/17 |
| 4,844,305 A * | 7/1989 | McKneely | 224/404 |
| 4,998,642 A | 3/1991 | Kraus | |
| 5,558,346 A | 9/1996 | Hartery | |
| 5,669,537 A * | 9/1997 | Saleem et al. | 224/539 |
| 5,725,272 A * | 3/1998 | Jones | 296/208 |
| 6,145,909 A * | 11/2000 | Staley et al. | 296/39.1 |
| 6,270,154 B1 * | 8/2001 | Farber | 296/213 |
| 6,641,202 B2 * | 11/2003 | Graf et al. | 296/107.04 |
| 6,691,468 B2 * | 2/2004 | Helferty | 49/463 |
| 6,898,901 B2 * | 5/2005 | Petroski et al. | 49/502 |
| 7,118,151 B2 * | 10/2006 | Bejin et al. | 296/37.1 |
| 7,597,372 B2 * | 10/2009 | Nagamoto et al. | 296/37.14 |
| 8,182,021 B2 * | 5/2012 | Maimin et al. | 296/100.09 |
| 2007/0024094 A1 * | 2/2007 | Varga | 296/218 |
| 2008/0148474 A1 * | 6/2008 | Witt | 4/613 |
| 2009/0078704 A1 | 3/2009 | Janke | |
| 2009/0191379 A1 * | 7/2009 | Filipczak et al. | 428/131 |
| 2012/0275096 A1 * | 11/2012 | Yang et al. | 361/679.01 |

FOREIGN PATENT DOCUMENTS

EP     0779203 A1     6/1997

* cited by examiner

*Primary Examiner* — Pinel Romain
(74) *Attorney, Agent, or Firm* — Quinn Law Group, PLLC

(57) ABSTRACT

A water deflector includes a skeleton and a skin. The skeleton fills substantially the entire perimeter of an access opening. The skin is formed integrally over the skeleton, such that at least a portion of the skeleton is captured by the skin. The skin also spans substantially all of an interior of the access opening. A snap feature is formed in the skeleton and configured to mate to a perimeter of the access opening. Therefore, the skeleton is configured to hold the water deflector in the access opening such that the water deflector prevents passage of moisture through the access opening.

13 Claims, 3 Drawing Sheets

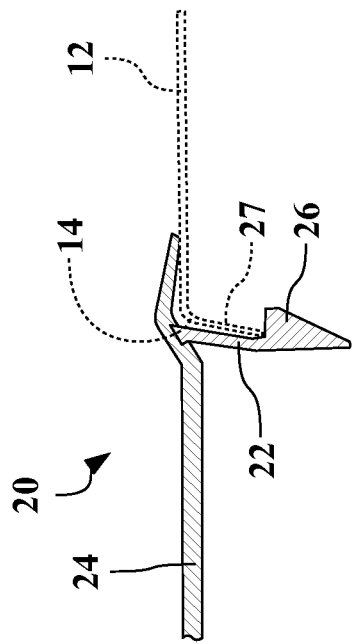
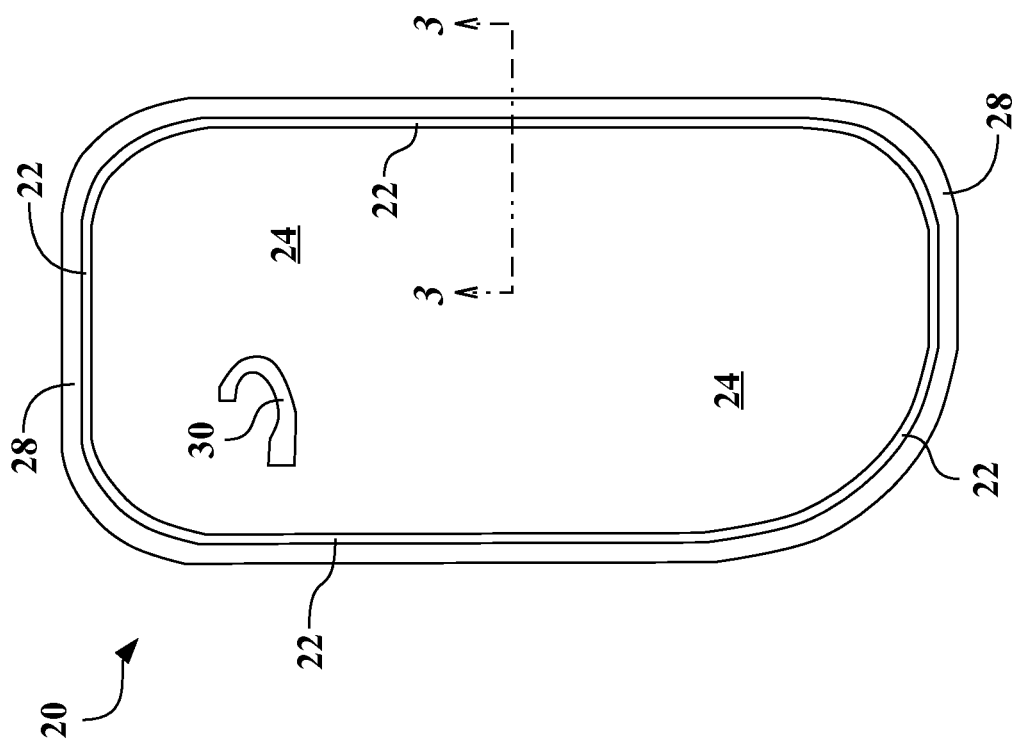

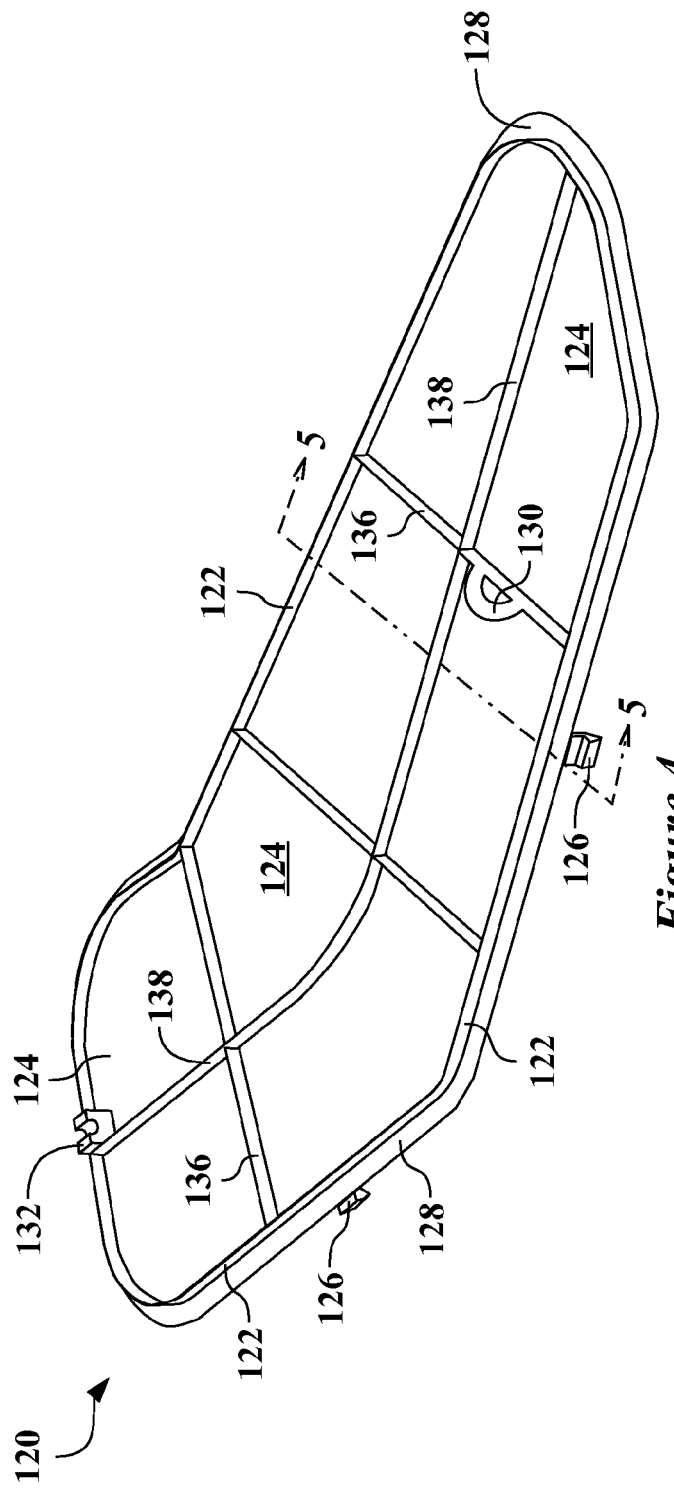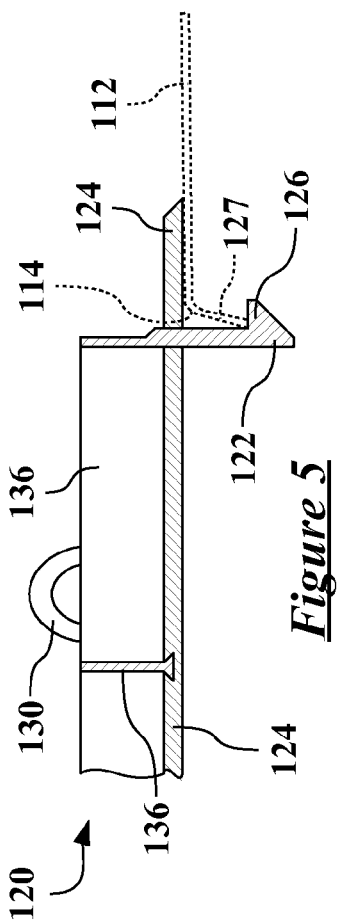

TUNABLE WATER DEFLECTOR

TECHNICAL FIELD

This disclosure relates to water deflectors used to prevent passage of moisture through panels, such as those found in doors.

BACKGROUND

Vehicle doors typically include a first outer sheet metal panel which defines the door's exterior. A spaced inner sheet metal door panel reinforces the outer panel and defines the chamber which houses various mechanisms including window operators, latches, and the like. Openings through the inner door panel allow access to the mechanisms. A trim panel usually covers the inner door panel and provides the decorative interior for the door.

SUMMARY

A water deflector for filling or closing an access opening formed in a panel is provided. The water deflector includes a skeleton and a skin. The skeleton fills substantially the entire perimeter of the access opening. The skin is formed integrally over the skeleton, such that at least a portion of the skeleton is captured by the skin.

The skin spans substantially all of an interior of the access opening. A snap feature is formed in the skeleton and is configured to mate to a perimeter of the access opening. Therefore, the skeleton is configured to hold the water deflector in the access opening and the water deflector prevents passage of moisture through the access opening.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 2 is a schematic, isometric view of the water deflector shown in FIG. 1;

FIG. 3 is a schematic, cross-sectional view of the water deflector taken along line 3-3 of FIG. 2;

FIG. 4 is a schematic, isometric view of another water deflector; and

FIG. 5 is a schematic, cross-sectional view of the water deflector shown in FIG. 4, taken along line 5-5 of FIG. 4.

DETAILED DESCRIPTION

Figure 1:
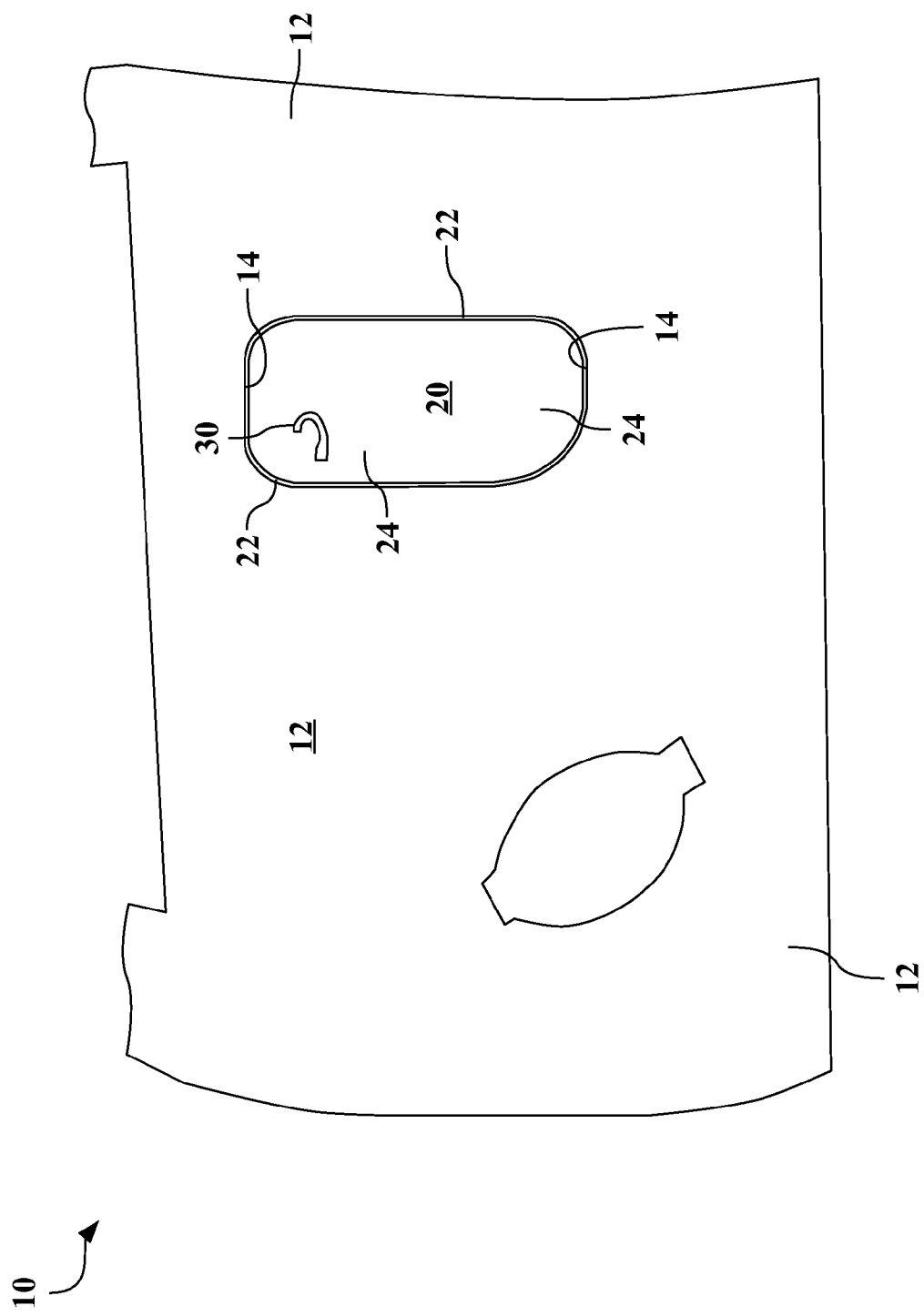
FIG. 1 is a schematic, plan view of a vehicle door having an access opening filled or closed by a water deflector.

Referring to the drawings, wherein like reference numbers correspond to like or similar components whenever possible throughout the several figures, there is shown in FIG. 1 a schematic plan view of a portion of a door 10, which may be used in numerous vehicles (not shown). The door 10 includes a panel 12, which provides structure for the primary shape of the door 10 and mounting points for many of the other components, such as braces and lock hardware (not separately numbered).

Features and components shown in other figures may be incorporated and used with those shown in FIG. 1, and components may be mixed and matched between any of the configurations shown. While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

An access opening 14 is formed in the panel 12. The access opening 14 may be used during assembly of the door 10 to attach or assemble components from one side of the panel 12 to the other. The door 10 is shown in FIG. 1 from what will be the exterior (outside) when assembled to the vehicle. Additional panels, such as an exterior body panel and an interior trim panel, may be assembled to the door 10. The door 10 also includes a speaker opening and speaker (not separately numbered).

As shown in FIG. 1, a water deflector 20 covers the access opening 14 and prevents passage of moisture and debris through the access opening 14. The access opening 14 is not covered with water paper, but is filled or sealed with the water deflector 20. The water deflector 20 substantially covers the access opening 14, including a perimeter and an interior thereof. However, in some configurations, the water deflector 20 may leave passageways open or may cooperate with other complements to fully block and seal the access opening 14. The water deflector 20 includes a skeleton 22 and a skin 24.

Referring now to FIG. 2 and to FIG. 3, and with continued reference to FIG. 1, there are shown additional views of the water deflector 20. FIG. 2 shows a schematic, isometric view of the water deflector 20, and FIG. 3 shows a schematic, cross-sectional view of the water deflector 20 taken along line 3-3 of FIG. 2.

The skeleton 22 extends or fills substantially the entire perimeter of the access opening 14 (shown illustratively in FIG. 3). The skin 24 spans substantially the entire interior of the access opening 14. The skeleton 22 provides the load-carrying frame or support structure for the water deflector 20 and is a strong, but flexible member. The skin 24 provides structure to prevent moisture and debris from passing through the access opening 14, and also acts as an acoustical barrier to deaden vibration and limit noise.

The water deflector 20 shown is configured with the skin 24 formed integrally over the skeleton 22. Therefore, at least a portion of the skeleton 22 is captured or surrounded by the skin 24.

As best viewed in FIG. 3, a snap feature 26 is formed in the skeleton 22. The snap feature 26 is configured to mate to the perimeter of the access opening 14, which may have a flange 27, shown in dashed lines, formed in the panel 12. Note, however, that the snap feature 26 may interact with a planar portion of the panel 12 instead of the flange 27. The snap feature 26 of the skeleton 22 provides structure to hold the water deflector 20 to the access opening 14 of the panel 12. The snap feature 26, like the skeleton 22, substantially fills the entire perimeter of the access opening 14. Alternatively, smaller, localized snap features 26 may be used to mate the water deflector to the access opening 14.

The water deflector 20 may be formed from two different materials having different material properties. For example, the skeleton 22 may be formed from a first material, and the skin 24 formed from a second material, different from the first material. In order to provide the structural framework for the water deflector 20, the first material of the skeleton 22 may be a relatively rigid plastic. By comparison, the second material of the skin 24 may a relatively-softer, denser plastic or rubber.

For the water deflector 20, the first material forming the skeleton 22 provides strength and structure, while the second material forming the skin 24 provides noise and vibration reduction. While the water deflector 20 could be made from a single material, that single material may have to compromise by losing strength to promote acoustic capabilities or by losing acoustic capabilities to promote strength.

In some configurations of the water deflector 20, the first material and the second material may be weatherable, thermoplastic vulcanizates, such as those containing fully crosslinked ethylene propylene diene monomer (EPDM) elastomer particles, dispersed in a continuous polypropylene (PP) matrix. Any specific material types listed are illustrative only, and other suitable materials may be used. The first material or the second material may be thermoplastic elastomers (TPE) or thermoplastic polymers.

The first and second materials are formulated to bond to vulcanized EPDM rubber and can be processed by injection molding. The first and second materials may contain internal lubrication, reducing or eliminating the need for secondary coating processes.

Differentiation or delineation of the first material from the second material types may be based upon hardness values. As a further example, the first material may be a hard thermoplastic elastomer and the second material may be a soft thermoplastic elastomer. For illustrative or exemplary purposes, and without limitation, soft thermoplastic elastomers may have Shore A hardness of between 30 to 60 and hard thermoplastic elastomers may have Shore A hardness of between 60 to 100. Persons having ordinary skill in the art will recognize other differentiating factors or ranges of hardness factors between hard and soft thermoplastic elastomers.

For example, and without limitation, the water deflector 20 may have the skeleton 22 formed from plastic with Shore A hardness of 65 to 75. Similarly, and also without limitation, the water deflector 20 may have the skin 24 formed from a plastic with Shore A hardness of 50 to 60. The water deflector 20 may therefore have a hardness ratio between the first material and the second material of approximately 1.3:1.

Depending upon the size and shape of the access opening 14 and the other characteristics needed, the first material and the second material of the water deflector 20 may be separately tuned. For example, if greater noise or vibration reduction is needed, the skin 24 may be thick and very dense to provide better acoustical properties. Furthermore, if the access opening 14 is large, a stiffer, stronger first material may be used to provide the framework for the skeleton 22.

The water deflector 20 may be formed with the skin 24 being integral to the skeleton 22 through a two-shot molding process. For example, and without limitation, the skeleton 22 may be molded by the first shot or first process and the skin 24 molded in the second shot or second process. The skeleton 22 may be completely over-molded by the skin 24 or only a portion of the skeleton 22 may be covered by the skin 24, as shown in FIGS. 2 and 3. If the skin 24 completely over-molds the skeleton 22, the interface between the snap feature 26 may be better able to seal against the flange 27 of the panel 12 because of the more-flexible nature of the second material from which the skin 24 is formed.

Note that each of the molding processes for the skeleton 22 and the skin 24 utilizes single-direction molds or dies. That is, the tools involved do not have multiple parts or require multi-directional or multi-piece mold cavities. Both of the components are molded in uni-direction molding tools, which may reduce the cost as compared to multi-directional tooling. As viewed in FIG. 3, the movement of the tooling and mold cavity is generally up and down.

In order to further seal around the access opening 14, the water deflector 20 may include an overlap portion 28 formed in the skin 24. The overlap portion 28 extends beyond the perimeter of the access opening 14 onto the panel and is formed from the same material as the skin 24.

The water deflector 20 may include features or structures to attach or route accessories of the door 10. For example and without limitation, a first accessory feature 30 may be formed from the second material and connected to the skin 24. The first accessory feature 30 may be used to route wires passing over or through the access opening 14 after the water deflector 20 is installed. The shape, size, and location of the accessory feature 30 is highly illustrative and is not intended to be limiting.

Referring now to FIG. 4 and to FIG. 5, and with continued reference to FIGS. 1-3, there are shown schematic views of a water deflector 120, which may also be used to fill and seal an access opening 114 of a panel 112 (both of which are shown in dashed lines in FIG. 5). FIG. 4 shows a schematic, isometric view of the water deflector 120, and FIG. 5 shows a schematic, cross-sectional view of the water deflector 120 taken along line 5-5 of FIG. 4.

The water deflector 120 also includes a skeleton 122 and a skin 124. The skeleton 122 extends or fills substantially the entire perimeter or circumference of the access opening 114. The skin 124 spans substantially the entire interior of the access opening 114. The skeleton 122 provides the load-carrying framework or support structure for the water deflector, and the skin 124 provides flexible structure to prevent moisture and debris from passing through the access opening 114.

The water deflector 120 shown is configured with the skin 124 formed integrally over the skeleton 122. Therefore, at least a portion of the skeleton 122 is captured or surrounded by the skin 124. Alternatively, the whole skeleton 122 may be overmolded, surrounded, or coated by the skin 124.

As best viewed in FIG. 5, at least one snap feature 126 is formed in the skeleton 122. The snap feature 126 is configured to mate to the perimeter of the access opening 114, which may have a flange 127 (shown in dashed lines in FIG. 5) formed in the panel 112. Note, however, that the snap feature 126 may interact with a planar portion of the panel 112 instead of the flange 127. The snap feature 126 of the skeleton 122 provides structure to hold the water deflector 120 to the access opening 114 of the panel 112.

Unlike the water deflector 20 shown in FIGS. 1-3, the water deflector 120 has a plurality of localized snap features 126 to mate the water deflector 120 to the access opening 114. Only two of the snap features 126 are viewable in FIG. 4, but additional snap features 126 may be used around the periphery to clip to the access opening 114 of the panel 112.

The water deflector 120 may be formed from two different materials having different material properties. For example, the skeleton 122 may be formed from a first material, and the skin 124 formed from a second material, different from the first material. In order to provide the structural framework for the water deflector 120, the first material of the skeleton 122 may be a relatively rigid plastic. By comparison, the second material of the skin 124 may be a relatively-softer, more-flexible plastic or rubber.

In order to further seal around the access opening 114, the water deflector 120 may include an overlap portion 128 formed in the skin 124. The overlap portion 128 extends beyond the perimeter of the access opening 114 onto the panel 112 and is formed from the same material as the skin 124.

The water deflector 120 may also include features or structures to attach or route accessories. For example and without limitation, a first accessory feature 130 and a second accessory feature 132 may be formed from the first material.

In addition to the structural framework provided by the skeleton 122, the water deflector 120 includes a first cross rib 136 formed from the first material. The first cross rib 136 is connected to the skeleton 122 and provides additional support for the water deflector 120. Furthermore, a second cross rib 138 is formed from the first material and connected to the skeleton 122. The additional structure of the first cross rib 136 and the second cross rib 138 may allow the water deflector 120 to span larger distances for the access opening 114.

The first cross rib 136 and the second cross rib 138 may also provide additional support for the first accessory feature 130 and the second accessory feature 132, or for added accessory features. The first accessory feature 130 may be connected to one of the skeleton 122, the first cross rib 136, and the second cross rib 138. Depending upon the configuration of the water deflector 120 the first cross rib 136 and the second cross rib 138 may be completely over-molded by the skin 124 or may only be partially captured by the skin 124.

Again, the first material may be a hard thermoplastic elastomer, and the second material may be a soft thermoplastic elastomer. For example, and without limitation, the first material of the skeleton 122 may have Shore A hardness of 75 to 85 and the second material of the skin 124 may Shore A hardness of 35 to 45. The water deflector 120 may therefore have a hardness ratio between the first material and the second material of approximately 2:1.

The first material and the second material of the water deflector 120 may be separately tuned to achieve different performance characteristics. For example, if greater noise or vibration reduction is needed, the skin 124 may be thick and very dense to provide better acoustical properties. However, if light weight is preferred, the skin 124 may be thinner and less dense at the possible expense of acoustical performance.

The first and second cross ribs 136, 138 provide added structural support and stiffness. Furthermore, if the access opening 114 is large, the water deflector 120 may be tuned by using a stiffer, stronger first material to provide the framework for the skeleton 122. The first material of the skeleton 122 may also be tuned based upon the type, location, and number of accessory features—such as the first and second accessory features 130, 132. Numerous accessory features may require that the first material be stronger, stiffer, and harder relative to embodiments or configurations with few accessory features supported by the skeleton 122.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A water deflector for an access opening formed in a panel, comprising:
   a skeleton inscribed to inner surfaces of the access opening, such that the skeleton fills substantially an entire perimeter of the access opening;
   a skin formed integrally over the skeleton, such that at least a portion of the skeleton is captured by the skin and wherein the skin spans substantially all of an interior of the access opening; and
   a snap feature formed in the skeleton and configured to mate to a perimeter of the access opening, such that the skeleton is configured to hold the water deflector in the access opening and the water deflector prevents passage of moisture through the access opening,
   wherein the skeleton is formed from a first material, and
   wherein the skin is formed from a second material, different from the first material.

2. The water deflector of claim 1, further comprising an overlap portion formed in the skin, wherein the overlap portion extends beyond the perimeter of the access opening.

3. The water deflector of claim 2,
   wherein the first material has a first hardness, and
   wherein the second material has a second hardness, lower than the first hardness.

4. The water deflector of claim 3, further comprising:
   a first cross rib formed from the first material and connected to the skeleton; and
   a second cross rib formed from the first material and connected to the skeleton.

5. The water deflector of claim 4, wherein the first cross rib and the second cross rib are over-molded by the skin.

6. The water deflector of claim 5, further comprising:
   a first accessory feature formed from the first material and connected to one of the skeleton, the first cross rib, and the second cross rib.

7. The water deflector of claim 6,
   wherein first material is a hard thermoplastic elastomer, and
   wherein second material is a soft thermoplastic elastomer.

8. The water deflector of claim 6, wherein a Shore A hardness of the first material is at least thirty percent higher than a Shore A hardness of the second material.

9. The water deflector of claim 6, wherein a Shore A hardness of the first material is at least twice a Shore A hardness of the second material.

10. A water deflector for an access opening formed in a panel, comprising:
    a skeleton, wherein the skeleton is inscribed to inner surfaces of the access opening and fills substantially the entire perimeter of the access opening but does not fill an interior of the access opening;
    a skin formed integrally over the skeleton, such that at least a portion of the skeleton is captured by the skin and wherein the skin spans substantially all of the interior of the access opening including space not filled the skeleton;
    a snap feature formed in the skeleton and configured to mate to a perimeter of the access opening, such that the skeleton is configured to hold the water deflector in the access opening and the water deflector prevents passage of moisture through the access opening; and
    an overlap portion formed in the skin, wherein the overlap portion extends beyond the perimeter of the access opening,
    wherein the skeleton is formed from a first material having a first hardness, and
    wherein the skin is formed from a second material having a second hardness, lower than the first hardness.

11. The water deflector of claim 10, further comprising:
    a first cross rib formed from the first material and connected to the skeleton.

12. The water deflector of claim 11, further comprising:
    a first accessory feature formed from the first material and connected to one of the skeleton and the first cross rib.

13. The water deflector of claim 12,
    wherein first material is a hard thermoplastic elastomer, and
    wherein second material is a soft thermoplastic elastomer.

* * * * *